United States Patent
James et al.

(10) Patent No.: US 9,529,812 B1
(45) Date of Patent: Dec. 27, 2016

(54) TIMESTAMP HANDLING FOR PARTITIONED DIRECTORIES

(75) Inventors: Freddy James, Maharashtra (IN); Kedar Patwardhan, Pune (IN); Sushil Patil, Maharashtra (IN); Anindya Banerjee, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 1008 days.

(21) Appl. No.: 13/104,150

(22) Filed: May 10, 2011

(51) Int. Cl.
*G06F 17/30* (2006.01)

(52) U.S. Cl.
CPC .............. *G06F 17/30106* (2013.01)

(58) Field of Classification Search
USPC ......................................................... 707/831
See application file for complete search history.

(56) References Cited

U.S. PATENT DOCUMENTS

| | | | |
|---|---|---|---|
| 7,630,994 B1* | 12/2009 | Deshmukh | G06F 17/302 |
| 2002/0138502 A1* | 9/2002 | Gupta | 707/200 |
| 2007/0005614 A1* | 1/2007 | Dodge | G06Q 20/401 |
| 2007/0276878 A1* | 11/2007 | Zheng et al. | 707/202 |
| 2012/0116976 A1* | 5/2012 | Hammad | G06F 21/34 705/67 |

* cited by examiner

*Primary Examiner* — Amresh Singh
(74) *Attorney, Agent, or Firm* — Campbell Stephenson LLP

(57) ABSTRACT

Various systems and methods use advisory metadata to track the status of file system objects. For example, one method can involve accessing a first item of advisory metadata, which is associated with a namespace-visible parent directory and identifies a first transaction and a first time, and accessing a second item of advisory metadata, which is also associated with the namespace-visible parent directory and identifies a second transaction and a second time. The namespace visible parent directory includes multiple namespace-hidden directories. The method can then select a time value of the advisory metadata for the namespace-visible parent directory, based upon the first item and the second item. The method can be performed by a computing device implementing a file system.

20 Claims, 5 Drawing Sheets

TIMESTAMP HANDLING FOR PARTITIONED DIRECTORIES

FIELD OF THE INVENTION

This invention relates to file systems and, more particularly, to metadata used to track the state of file system objects within file systems.

DESCRIPTION OF THE RELATED ART

File systems are applications that organize user data into a data structure, which is also referred to as a file system, and manage access to the user data within that data structure. In particular, a file system can manage access to user data that has been organized into individual files. If a hierarchical organization of user data is desired, the file system can provide special files, called directories, that can each contain multiple files or subdirectories.

Typically, the file system controls access to files (including special files like directories) such that only one user and/or process can modify a given file at a given time. Additionally, the file system usually updates metadata associated with the files to indicate the characteristics (such as time and type of modification, the file system object(s) affected by the modification, as well as the identity of the user or process that requested the modification) of the modification.

In certain situations, the organization of the file system, combined with the need to maintain metadata about each modification to user data within the file system, can lead to performance bottlenecks. For example, if there are a large number of files within a single directory, the file system's need to update the modification time for the directory each time that the directory is modified as a result of changes to the underlying files may effectively prevent parallel modifications to different files within the directory. While this outcome is desirable in some circumstances, it may present an unwanted performance bottleneck in others.

SUMMARY OF THE INVENTION

Various systems and methods for using advisory metadata to track the state of a file system object affected by a transaction, where determining a final value for the state requires accessing advisory metadata associated with other transactions, are disclosed. Such advisory metadata can be used to track the timestamps associated with access to partitioned directories. For example, one method can involve accessing a first item of advisory metadata, where the first item is associated with a file system object and a first transaction, and also accessing a second item of advisory metadata, where the second item is associated with the file system object and a second transaction. The method can then select a value of the advisory metadata for the file system object, based upon the first item and the second item. The method can be performed by a computing device implementing a file system.

In some embodiments, the value of the advisory metadata specifies a most recent access time for a namespace visible parent directory that includes multiple hidden partitioned directories. Alternatively, the value of the advisory metadata can specify a most recent access time for a shared file system in a clustered computing system. In the later embodiments, the method can also involve generating the first item of advisory metadata. The first item can be generated by a first node in the clustered computing system while the first node holds a shared lock on the file system object.

Other embodiments of a method can involve accessing a first item of advisory metadata, which is associated with a namespace-visible parent directory and identifies a first transaction and a first time, and accessing a second item of advisory metadata, which is also associated with the namespace-visible parent directory and identifies a second transaction and a second time. The namespace visible parent directory includes multiple namespace-hidden directories. The method can then select a time value of the advisory metadata for the namespace-visible parent directory, based upon the first item and the second item. The method can be performed by a computing device implementing a file system.

In one embodiment, selecting the time involves selecting a greater of the first time or the second time as the time value. In some embodiments, accessing the first item involves accessing a log, which stores multiple items of the advisory metadata, including the second item of advisory metadata. The method can be performed in response to receiving a request to replay a transaction during crash recovery.

Such a method can also involve generating the first item of advisory metadata in response to detecting a modification to contents of one of the namespace-hidden partitioned directories, where the modification is caused by the first transaction. The first item of advisory metadata can be generated after gaining shared access to the advisory metadata. In some situations, the first item of advisory metadata and the second item of advisory metadata are generated during overlapping time periods.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
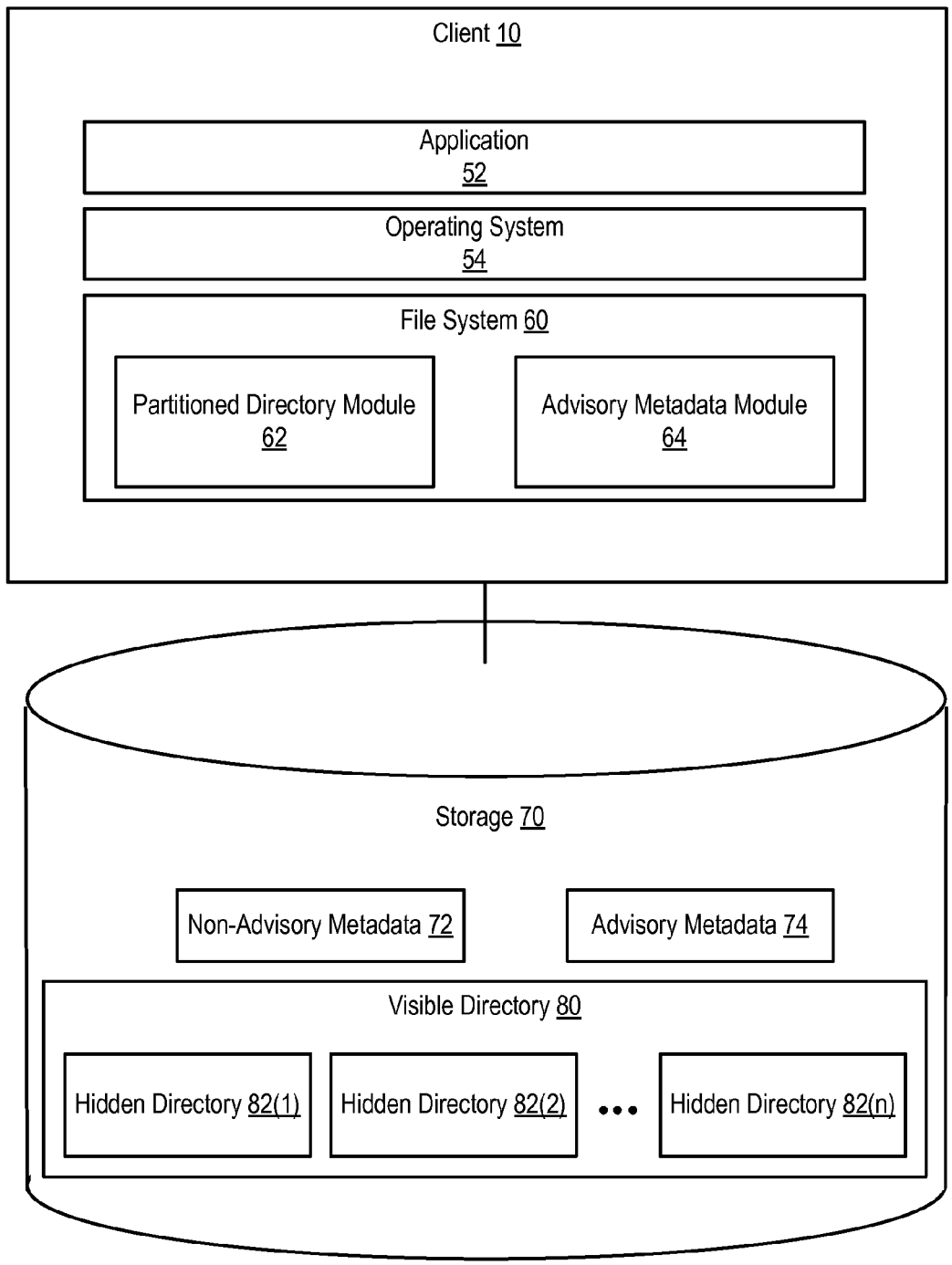
FIG. 1 is a block diagram of a system in which a file system generates advisory metadata, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A file system can maintain advisory metadata for each file system object within a set of file system objects. When a file system operation requests a value of the advisory metadata, the file system accesses all of the currently available advisory metadata and, based upon the values of the accessed metadata, selects one value to be returned in response to the file system operation. Advisory metadata differs from conventional, non-advisory metadata in that a single item of advisory metadata does not necessarily provide a meaningful value; instead, a value is selected based upon the several items of advisory metadata, each of which is associated with a different transaction.

An example of advisory metadata is a timestamp associated with a visible parent directory that contains several hidden partitioned directories. Partitioned directories can be implemented in situations in which it is desirable to provide parallel access to files within a parent directory. The parent directory remains visible within the namespace (e.g., the set of named file system objects that the file system makes accessible to other applications) of the file system, while the partitioned directories are hidden from the namespace. Thus, applications other than the file system are not aware of and cannot directly access the partitioned directories.

The file system organizes the file system objects (e.g., files) within the parent directory into the hidden partitioned directories. When an application accesses one of the files, the file system redirects the access to the appropriate hidden partitioned directory. For example, if an application requests access to file A within directory 1, and if directory 1 includes four hidden partitioned directories, the file system selects the appropriate hidden directory H1 that contains file A, and converts the access from Directory 1/File A to Directory 1/Hidden Directory H1/File A. In other words, a transaction targeting Directory 1/File A is converted to a transaction targeting Directory 1/Hidden Directory H1/File A. Files within different hidden partitioned directories can be accessed in parallel, thus reducing the bottleneck provided by having a single parent directory that contains a multitude of files.

Whenever a file is accessed (e.g., to be modified), the file system can track the time of the access. If the file is contained within a directory and if the access causes the directory's contents and/or metadata to change (e.g., if the access creates, deletes, or renames a file within the directory, that access also modifies the contents of the directory), the file system can also use the time of the access as the time at which the containing directory was last modified. In the case of a visible parent directory that contains multiple hidden partitioned directories, however, storing metadata such as the most recent modification time for the visible parent directory could introduce a new bottleneck if conventional techniques are used. In particular, if the contents of any of the hidden directories are changed, the visible parent directory's contents are changed as well. This means that even though accesses may modify the contents of different hidden directories, those accesses will all affect the contents of the visible parent directory.

Conventionally, the metadata for the visible parent directory could only be updated for one modification at a time, even if the changes occurred within different hidden directories, which would serialize the operations that caused each modification to the visible parent directory's contents. Thus, the need to store conventional metadata would effectively serialize accesses to the visible parent directory, thereby undoing the potential parallelism provided by the hidden partitioned directories.

In order to avoid this problem, the time of access to the visible parent directory can be tracked as advisory metadata. To create advisory metadata, it is unnecessary to gain exclusive access to the visible parent directory and its conventional metadata. As such, multiple items of advisory metadata can be created at the same time (or at least during overlapping periods of time), even if those items of metadata are all associated with the same file system object (e.g., the same visible parent directory). Because items of advisory metadata can be created without gaining exclusive access to the visible parent directory, the items of advisory metadata may not, on their own, be entirely accurate. For example, two transactions T1 and T2 can target files within different hidden directories in the same visible parent directory. Transaction T1 can commit (i.e., complete, which includes both performance of the transaction and being ready to signal completion of the transaction to the application that requested the transaction) prior to transaction T2; however, the advisory metadata associated with T2 may specify an earlier time (e.g., 3:30 AM) than the time (e.g., 3:31 AM) specified by the advisory metadata associated with T1.

To interpret the different access times associated with the visible parent directory as advisory metadata in light of the potential inaccuracies, the file system reads all of the logged access times and picks the greatest time (e.g., the latest time in chronological order). For example, in the above situation, the file system could read the items of advisory metadata associated with all committed transactions, including T1 and T2, and select the most recent time: 3:31 AM. Thus, instead of simply reading a single, conventional item of metadata to determine the time at which the visible parent directory was most recently accessed, the file system instead reads several items of advisory metadata, and then selects a time (e.g., the greatest of the accessed times) based on those items. More details and examples of how advisory metadata can be used are provided with respect to the specific figures described below, beginning with FIG. 1.

FIG. 1 is a block diagram of a computing system. As shown, the computing system includes a client 10 and storage device 70. Client 10 is a computing device such as a personal computer, laptop computer, server, personal digital assistant, cell phone, or the like. Client 10 can include and/or be coupled (e.g., via a bus, network, or other appropriate interconnect) to storage device 70. Client 10 can also be coupled to other computing devices and/or storage devices by a WAN (Wide Area Network), such as the Internet, one or more LANs (Local Area Networks), and/or one or more SANs (Storage Area Networks).

Storage device 70 provides persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

Client 10 implements application 52, operating system 54, and file system 60. Application 52 can be a word processing program, email program, graphic editing program, database application, or the like. Application 52 accesses (e.g., by generating and/or consuming) application data on storage device 70. In particular, application 52 is configured to initiate transactions that access (e.g., in order to modify or read) a file stored on storage device 70. Operating system 54 controls the hardware of client 10 and provides various services to applications executing on client 10. Operating system 54 can facilitate interactions between application 52 and file system 60.

File system 60 is a special application that manages user data, which is maintained in a special data structure that is also referred to as a file system. File system 60 performs transactions that access user data stored within the file system structure. Performance of a transaction involves receiving a request (e.g., from application 52) to perform the transaction, performing the access specified in the request, and then signaling completion of the access to the requester.

File system 60 includes a partitioned directory module 62 that is configured to manage access to file system objects stored within hidden partitioned directories. Partitioned directory module 62 can create hidden partitioned directories (e.g., in response to the number of files within a parent directory exceeding a prespecified threshold) and move files from a name-space visible parent directory into a hidden partitioned directory. Partitioned directory module 62 can also convert transactions targeting files in a namespace-visible directory (e.g., such as visible directory 80 stored on storage 70) into transactions targeting files within hidden directories (e.g., such as hidden directories 82(1)-82(n)).

File system 60 is configured to maintain conventional, non-advisory metadata 72 for the file system objects (e.g., files, directories, and the like) within the file system structure. This conventional metadata 72 uses a single value to represent a characteristic of a file system object. For example, the size of a file can be represented by a single value. To obtain the size of the file system object, the file system can simply access this single value. Metadata 72 can be stored in an Mode structure or other appropriate data structure.

File system 60 also includes an advisory metadata module 64. Advisory metadata module 64 is configured to generate and interpret advisory metadata 74. As noted briefly above, advisory metadata differs from conventional, non-advisory metadata in that the file system may need to access multiple items of advisory metadata, each of which can contain different values and be associated with different transactions, before selecting a single value for the characteristic represented by the advisory metadata. Advisory metadata module 64 handles creating, maintaining, and interpreting the advisory metadata, as explained in more detail below.

As an example of how the system in FIG. 1 operates, consider a situation in which applications on client 10 generate two parallel (i.e., overlapping in time) transactions. The first transaction T1 targets a file F1 (not shown) in visible directory 80. The second transaction T2 targets a file F2 (also not shown) in visible directory 80.

Partitioned directory module 62 converts transaction T1 into a transaction that targets file F1 in hidden directory 82(1) of visible directory 80. Similarly, partitioned directory module 62 converts transaction T2 into a transaction that targets file F2 in hidden directory 82(2) of visible directory 80.

File system 60 performs the two transactions, both of which modify the targeted files in a manner that changes the contents of the hidden directories, and thus the visible parent directory, that respectively contain the targeted files. Transaction T1 modifies file F1 (e.g., by renaming F1). In response, the file system updates metadata associated with file F1, as well as metadata associated with hidden directory 82(1) and visible directory 80, to indicate that a modification happened at time TIME1. The metadata associated with file F1 and hidden directory 82(1) can be maintained as conventional metadata. Accordingly, prior to updating this metadata, transaction T1 needs to obtain exclusive access to each item of conventional metadata.

Gaining exclusive access to an item of conventional metadata involves communicating with the file system in order to prevent any other transaction from modifying the file system object described by the item of conventional metadata at the same time as the transaction that has exclusive access to the file system object. Exclusive access can be gained by accessing a locking mechanism or other appropriate serializing mechanism. If another transaction already has exclusive access to the file system object and its conventional metadata, the requesting transaction must wait for the other transaction to release its exclusive access before being able to gain exclusive access to the file system object.

In contrast, at least some of the metadata associated with visible directory 80 can be maintained as advisory metadata. To update the most recent modification time associated with visible directory 80 in response to transaction T1, advisory metadata module 64 generates information identifying transaction T1, visible directory 80, and time TIME1 and stores this information as part of advisory metadata 74. No exclusive access is needed to modify advisory metadata 74, and thus multiple transactions can modify advisory metadata 74 during overlapping times. In some embodiments, to modify advisory metadata, the transaction causing the modification can gain shared (non-exclusive) access to the file system object and its associated advisory metadata. Multiple transactions can have shared access to the same file system object and its advisory metadata at the same time.

Transaction T2 modifies file F2 (e.g., by creating file F2). In response, the file system updates metadata associated with file F2, as well as metadata associated with hidden directory 82(2) and visible directory 80, to indicate that a modification happened at time TIME2. The metadata associated with file F2 and hidden directory 82(2) can be maintained as conventional metadata. Meanwhile, the metadata associated with visible directory 80 is maintained as advisory metadata 74. Advisory metadata module 64 can create an item of advisory metadata that identifies transaction T2, visible directory 80, and time TIME2 in response to transaction T2 being performed.

In some embodiments, advisory metadata 74 is maintained as a log structure (or a plurality of such structures, each of which can be associated with a different file system object or set of file system objects). Each item of advisory metadata 74 is stored in a different record within the log. Thus, for the example above, there would be two records: one associated with transaction T1 and another associated with transaction T2.

If file system 60 subsequently needs the most recent time at which visible directory 80 was modified, advisory metadata module 64 accesses advisory metadata 74 and obtains, at least, the two items associated with transactions T1 and T2. Advisory metadata module 64 then selects a time to use as the most recent time at which visible directory 80 was modified, based on, at least, those two items. For example, advisory metadata module 64 can compare TIME1 and TIME2 to see which is greater, and then use the greater value as the most recent modification time. In response to obtaining this value, file system 60 can then update a conventional, non-advisory item of metadata to store the value and/or return the value to an application that requested the value.

A variety of different algorithms can be used to select a single value based upon multiple items of advisory metadata. For example, as described above, when each item of advisory metadata includes a time and the advisory metadata represents the most recent access time, the greatest time included in all of the advisory metadata items can be selected as the most recent access time. Other algorithms can select a value that is not itself present within the set of advisory metadata items (e.g., such algorithms can calculate the mean or average of the values in the advisory metadata items).

It is noted that multiple different sets of advisory metadata can be maintained in the same system. For example, a file system can be configured to generate a set of advisory metadata for each namespace-visible parent directory that includes hidden partitioned directories. Accordingly, different sets can be maintained for different parent directories. Additionally, different sets can be used to track different characteristics of the same file system object. For example, one set can be used to track the most recent access (of any type) time for a file system object, while another set can be used to track the most recent modification (e.g., only accesses that somehow change the contents or name of the file system object) time for the same file system object. Thus, two different sets of advisory metadata can be maintained for the same file system object.

Sets of advisory metadata can be maintained for various lengths of time and/or under various circumstances, depending on the embodiment. For example, in one embodiment, a given set of advisory metadata can be maintained in a circular log, such that once the maximum number of entries in the log is filled, newer entries will overwrite the oldest entries. In other embodiments, each item of advisory metadata can expire after a predesignated amount of time. Other techniques may also be used to constrain the number of items of advisory metadata in existence at a given time, if desired.

In some embodiments, client 10 can be part of a clustered computing system or other networked environment. In such a computing system, multiple clients, referred to as nodes, can share access to the same file system structure. Each node can access the shared file system at the same time. To avoid inconsistencies that might otherwise arise, each node is required to first gain ownership of a file system object before modifying that file system object. Ownership is a form of exclusive access and can be obtained through a locking or other serializing mechanism.

If the shared file system includes a parent directory that includes multiple files, or a parent directory that includes multiple hidden partitioned subdirectories, it may be desirable for a node to be able to gain ownership of a file without necessarily gaining ownership of the containing directory in order to provide greater parallelism in access to the shared file system. In such situations, advisory metadata can be used to track characteristics of the containing directory (or other file system objects), in the manner described above. Advisory metadata can be modified after gaining shared (non-exclusive) access to the file system object associated with the advisory metadata, and multiple nodes can have shared access (e.g., granted to each node after that node acquires a shared lock on the advisory metadata) to the same file system object (and its associated advisory metadata) at the same time.

Thus, two nodes in a cluster can each modify a different file within the same containing directory in a manner that modifies the containing directory's contents and/or metadata at substantially the same time. The first node (e.g., client 10) can modify a file F1 at time TIME1 as part of transaction T1, and a second node (not shown) can modify a file F2 at time TIME2 as part of a transaction T2. Both files F1 and F2 are included in the same directory D. An advisory metadata module can maintain advisory metadata for directory D, such that advisory metadata items can be created for directory D without the need to first gain ownership of directory D. Accordingly, one item of advisory metadata can be created (e.g., by an advisory metadata module executing on the first node) for the transaction T1 initiated by the first node, and another item of advisory metadata can be created (e.g., by an advisory metadata module executing on the second node) for the transaction T2 initiated by the second node. If the most recent modification time for directory D is subsequently needed, an advisory metadata module can access all of the advisory metadata items (e.g., by requesting the advisory metadata items from each node in the computing system) associated with directory D and select a modification time based upon the values included in the accessed advisory metadata items.

Figure 2A:
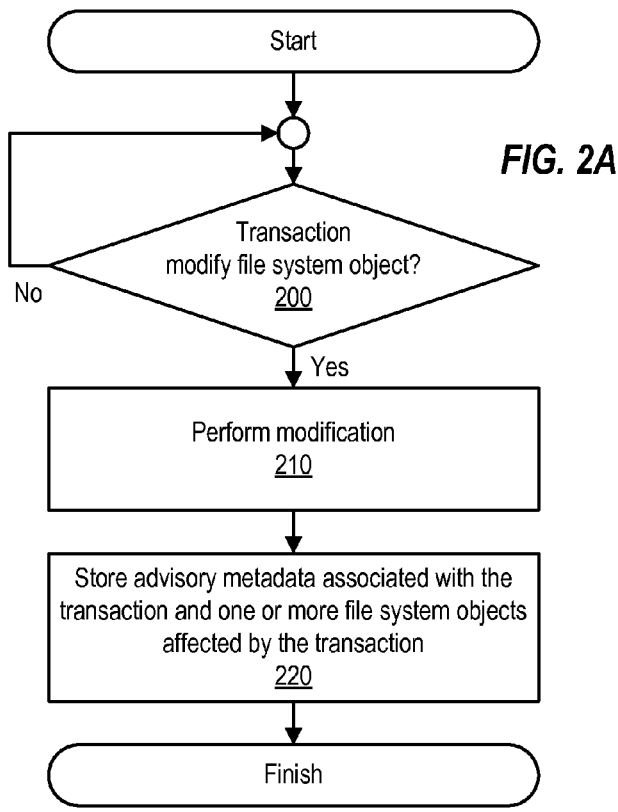
FIGS. 2A and 2B are flowcharts of methods of generating and consuming advisory metadata, according to one embodiment of the present invention.
Figure 2B:
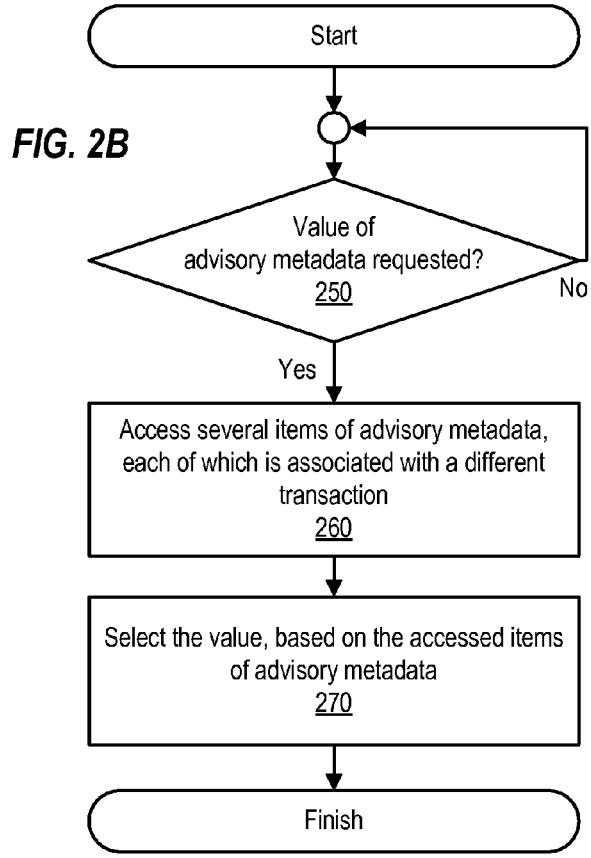

FIGS. 2A and 2B are flowcharts of methods of generating and consuming advisory metadata. These methods can be performed by a file system that includes an advisory metadata module such as advisory metadata module 64 of FIG. 1.

The method of FIG. 2A illustrates how an item of advisory metadata can be created. At 200, the method detects whether a transaction is modifying (or otherwise accessing, depending upon the characteristics being tracked by the advisory metadata) a file system object. If so, the file system performs the modification, as indicated at 210, and stores advisory metadata associated with the transaction, as shown at 220. Storing the advisory metadata can be performed without gaining exclusive access to the file system object associated with the advisory metadata (e.g., instead, shared access (e.g., in the form of shared lock) can be gained prior to generating and storing the advisory metadata).

The advisory metadata is associated with the transaction (detected at 200) that caused the modification (performed at 210), as well as with one or more file system objects (e.g., such as a namespace-visible parent directory, if the transaction modifies that directory's contents and/or metadata) affected by the transaction. The advisory metadata can identify one or more characteristics of the modification and/or the file system object. For example, the advisory metadata can indicate a time at which the modification was performed, a size of the file system object after the modification was performed, the identity of the application that initiated the transaction, or the like. Storing the advisory metadata can involve creating a new record to be added to a log or other data structure.

The method of FIG. 2A can be repeated for multiple different transactions, each of which can affect the same file system object (e.g., such as a directory that contains the file system object being modified). Thus, multiple items of advisory metadata, each associated with a different transaction, can be created.

FIG. 2B illustrates how a file system that includes an advisory metadata module can interpret advisory metadata. The method begins at 250, when the file system detects that a value of the advisory metadata is requested for a file system object. For example, if the file system maintains a set of advisory metadata to track the most recent access time to a directory, the file system can detect that an operation (e.g., such as a transaction replay performed during crash recovery) that requires the most recent access time has been requested.

The file system then accesses the items of advisory metadata associated with the file system object for which the value has been requested, as indicated at 260. This can involve reading multiple records from a log. In one embodiment, the file system accesses all of the items of advisory metadata that are associated with the file system object and that represent the desired characteristic. For example, if the file system has detected that the most recent access time is requested, the file system can access all items of advisory metadata within a set that represents the most recent access time.

As shown at 270, the file system then selects a single value of the advisory metadata, based upon the values accessed at 260. This selection can be performed by directly selecting one of the values in the set of advisory metadata (e.g., after comparing all of the values to each other) or by indirectly calculating a value that is based upon the values in the set (e.g., by calculating an average or mean value from the values in the set). The file system can then store this selected value as non-advisory, conventional metadata (e.g., in an Mode structure) and/or return this selected value to a requesting application.

Figure 3A:
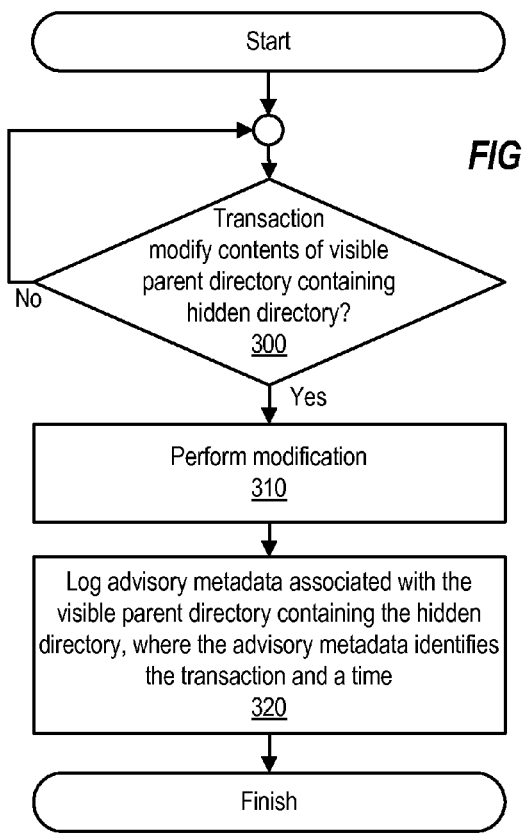
FIGS. 3A and 3B are flowcharts of methods of generating and consuming timestamps for the visible parent of multiple hidden partitioned directories, according to one embodiment of the present invention.
Figure 3B:
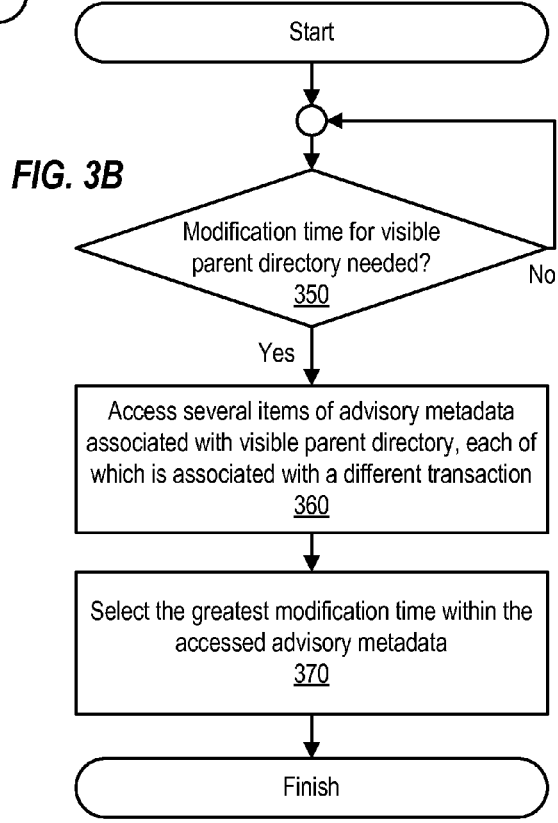

FIGS. 3A and 3B are flowcharts of methods of generating and consuming timestamps for the visible parent of multiple hidden partitioned directories. These methods can be performed by a file system that includes a partitioned directory module and an advisory metadata module.

The method of FIG. 3A begins at 300, when the file system detects that a transaction is modifying (or otherwise accessing, depending upon the characteristics to be tracked by the advisory metadata) a file system object in a hidden directory in a manner that changes the hidden directory's (and thus the visible parent directory's) contents and/or metadata. In response, the file system performs the modification, at 310, and logs (or otherwise stores) appropriate advisory metadata, as shown at 320.

The advisory metadata logged at 320 is associated with the visible parent directory that contains the hidden directory noted in operation 300. The advisory metadata identifies the transaction that caused the modification as well as the time that the modification occurred. The time can be generated based upon the current value of a system clock.

The method of FIG. 3A can be repeated for multiple different transactions, each of which can affect the same visible parent directory. Thus, multiple items of advisory metadata, each associated with a different transaction (which can in turn each target a different file system object and/or a different hidden directory), can be created.

FIG. 3B illustrates how a set of advisory metadata representing the modification time of a visible parent directory, which includes multiple hidden directories, can be interpreted to obtain a single, non-advisory modification time.

The method of FIG. 3B begins at 350, when the file system detects that the most recent modification time for the visible parent directory is needed (e.g., to perform a transaction replay operation). In response, the file system accesses several items of advisory metadata. These items can be included in a set of advisory metadata that tracks the most recent modification time of the visible parent directory. In some embodiments, the file system accesses all items within a relevant set of advisory metadata.

Each of the accessed items of advisory metadata is associated with the visible parent directory. Additionally, each of the accessed items is associated with a different transaction that affected the parent directory.

The file system then selects the greatest (most recent) modification time within the accessed advisory metadata items, as shown at 370. This selected time will be used as the most recent modification time of the visible parent directory. The selected time can be stored in an Mode associated with the visible parent and/or returned to a requesting application.

Figure 4:
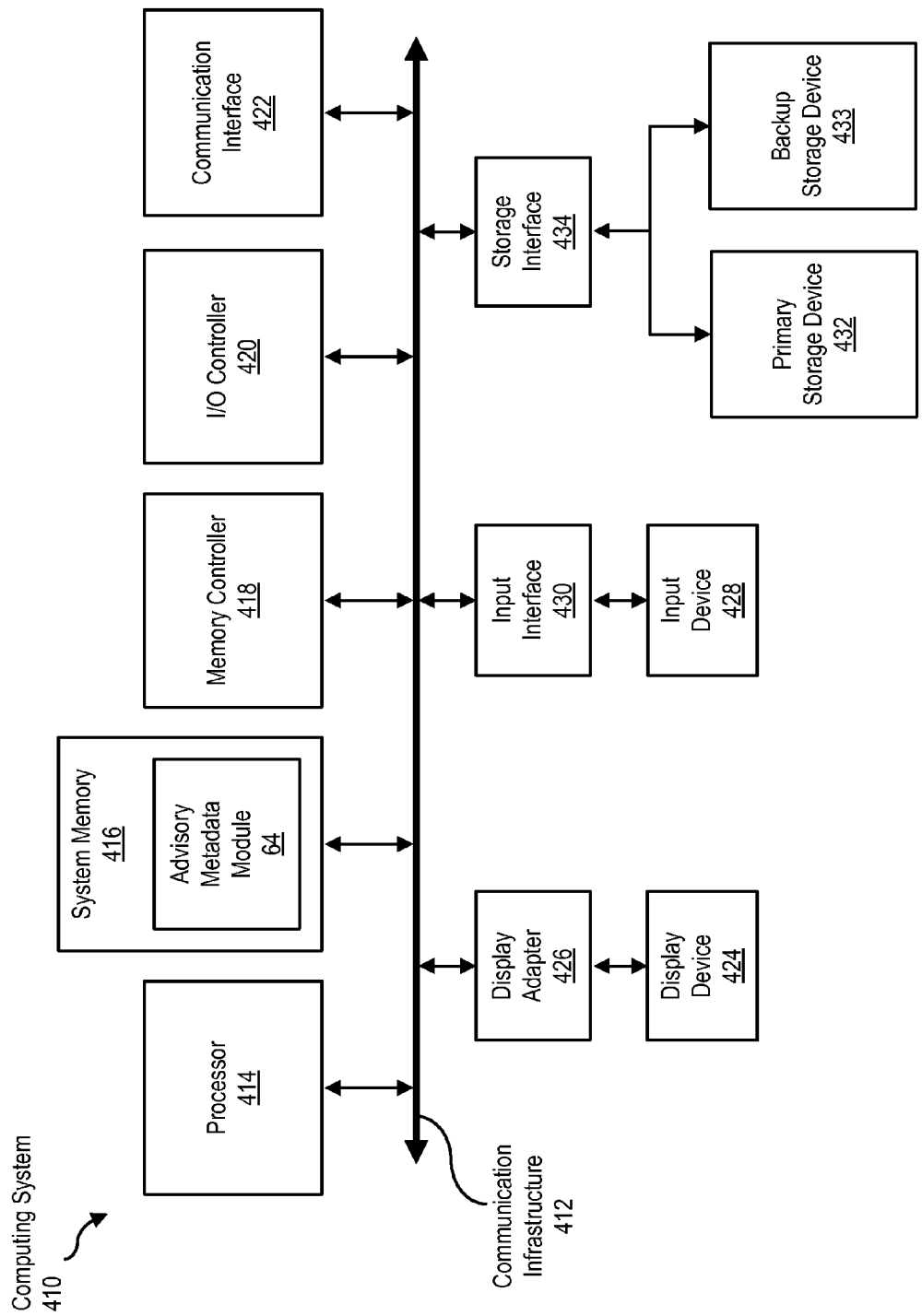
FIG. 4 is a block diagram of a computing device, illustrating how a client deduplication module can be implemented in software, according to one embodiment of the present invention.

FIG. 4 is a block diagram of a computing system 410 capable of maintaining and interpreting advisory metadata as described above. Computing system 410 broadly represents any single or multi-processor computing device or system capable of executing computer-readable instructions. Examples of computing system 410 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 410 may include at least one processor 414 and a system memory 416. By executing the software that implements an advisory metadata module 60, computing system 410 becomes a special purpose computing device that is configured to create and interpret advisory metadata, such as advisory metadata that indicates the most recent access and/or modification time of a namespace-visible directory that includes multiple hidden partitioned directories.

Processor 414 generally represents any type or form of processing unit capable of processing data or interpreting and executing instructions. In certain embodiments, processor 414 may receive instructions from a software application or module. These instructions may cause processor 414 to perform the functions of one or more of the embodiments described and/or illustrated herein. For example, processor 414 may perform and/or be a means for performing the operations described herein. Processor 414 may also perform and/or be a means for performing any other operations, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, program instructions executable to implement an advisory metadata module 64 (e.g., as shown in FIG. 1) may be loaded into system memory 416.

In certain embodiments, computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller 418 may perform and/or be a means for performing, either alone or in combination with other elements, one or more of the operations or features described and/or illustrated herein.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, computing system 410 may also include at least one input device 428 coupled to communication infrastructure 412 via an input interface 430. Input device 428 generally represents any type or form of input device capable of providing input, either computer or human generated, to computing system 410. Examples of input device 428 include, without limitation, a keyboard, a pointing device, a speech recognition device, or any other input device.

As illustrated in FIG. 4, computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. A storage device like primary storage device 432 can store information such as advisory metadata, non-advisory metadata, and file system objects such as files and directories.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4.

Computing system 410 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 410 for storage in memory via a network such as the Internet or upon a carrier medium.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the embodiments described and/or illustrated herein. Additionally or alternatively, one or more of the embodiments described and/or illustrated herein may be implemented in firmware and/or hardware. For example, computing system 410 may be configured as an application specific integrated circuit (ASIC) adapted to implement one or more of the embodiments disclosed herein.

Figure 5:
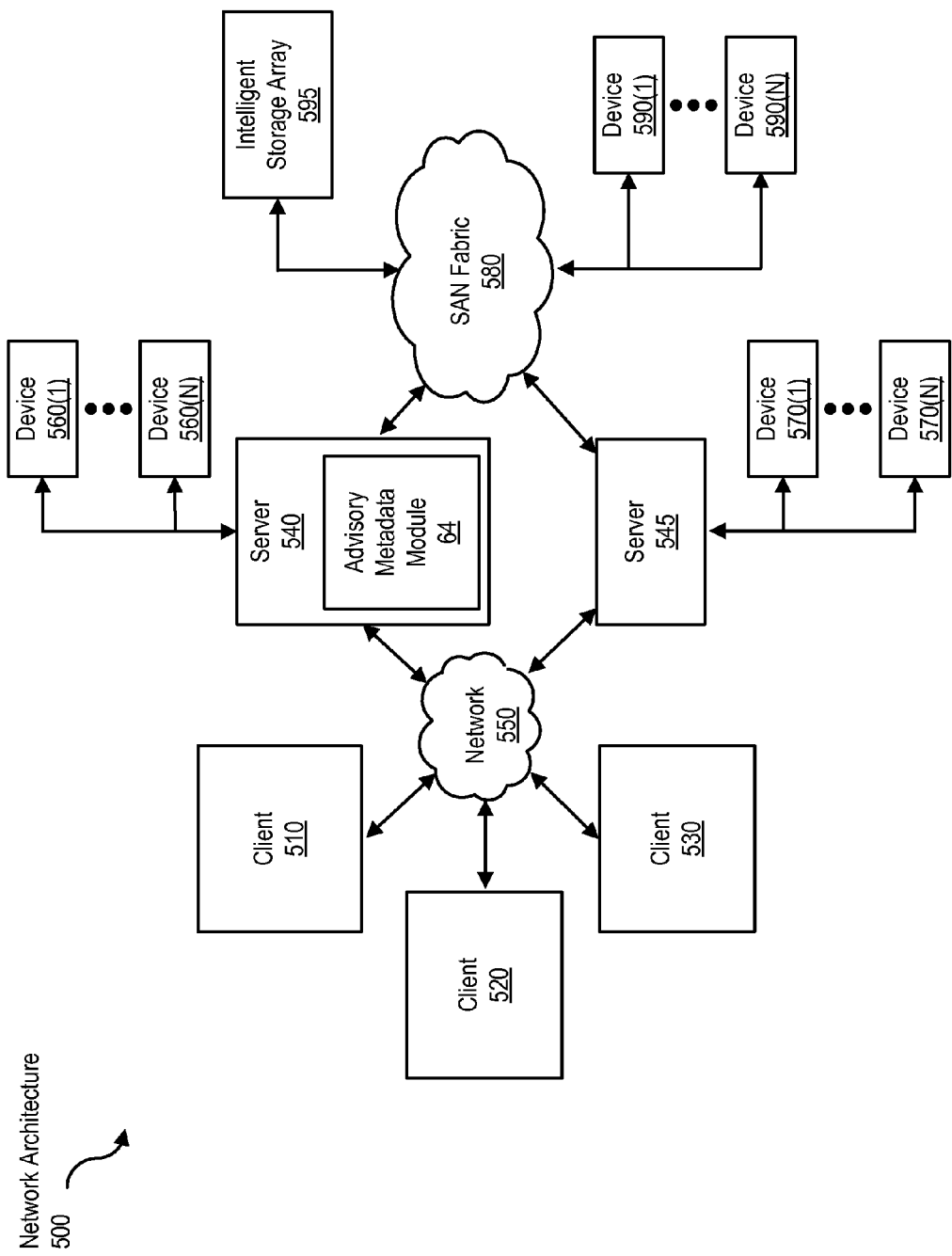
FIG. 5 is a block diagram of a networked system, illustrating how various computing devices can communicate via a network, according to one embodiment of the present invention.

FIG. 5 is a block diagram of a network architecture 500 in which client systems 510, 520, and 530 and servers 540 and 545 may be coupled to a network 550. Client systems 510, 520, and 530 generally represent any type or form of computing device or system, such as computing system 410 in FIG. 4.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet. In one example, one or more of servers 540 and 545 and/or client systems 510, 520, and 530 may include an advisory metadata module 64 as shown in FIG. 1.

As illustrated in FIG. 5, one or more storage devices 540(1)-(N) may be directly attached to server 540. Similarly, one or more storage devices 570(1)-(N) may be directly attached to server 545. Storage devices 540(1)-(N) and storage devices 570(1)-(N) generally represent any type or form of storage device or medium capable of storing data and/or other computer-readable instructions. In certain embodiments, storage devices 540(1)-(N) and storage devices 570(1)-(N) may represent network-attached storage (NAS) devices configured to communicate with servers 540 and 545 using various protocols, such as Network File System (NFS), Server Message Block (SMB), or Common Internet File System (CIFS). Such storage devices can store advisory metadata, non-advisory metadata, and file system objects, as described above.

Servers 540 and 545 may also be connected to a storage area network (SAN) fabric 580. SAN fabric 580 generally represents any type or form of computer network or architecture capable of facilitating communication between multiple storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 540(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to computing system 410 of FIG. 4, a communication interface, such as communication interface 322 in FIG. 5, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 540(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 540, server 545, storage devices 540(1)-(N), storage devices 570(1)-(N), storage devices 590(1)-(N), intelligent storage array 595, or any combination thereof. All or a portion of one or more of the embodiments disclosed herein may also be encoded as a computer program, stored in server 540, run by server 545, and distributed to client systems 510, 520, and 530 over network 550.

In some examples, all or a portion of one of the systems in FIGS. 1, 4, and 5 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, an advisory metadata module may transform the behavior of a file system such that exclusive access to a containing directory or its metadata is not needed to complete a transaction to a file system object within that containing directory. An advisory metadata module may also transform a set of multiple items of advisory metadata into a single, non-advisory value.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a request for a value for a first item of conventional metadata;
accessing a first item of advisory metadata, wherein
the first item of advisory metadata is associated with a file system object and a first transaction,
the first item of conventional metadata is also associated with the file system object,
the file system object is a namespace-visible parent directory comprising at least a first namespace-hidden partitioned directory, and
the first transaction is associated with the first namespace-hidden partitioned directory;
accessing a second item of advisory metadata, wherein
the second item of advisory metadata is associated with the file system object and a second transaction, and
the second transaction is associated with the first namespace-hidden partitioned directory;
selecting the value for the first item of conventional metadata, based upon the first item of advisory metadata and the second item of advisory metadata, wherein the accessing the first item of advisory metadata, the accessing the second item of advisory metadata, and the selecting the value for the first item of conventional metadata are performed by a computing device implementing a file system; and
updating the value of the first item of conventional metadata, wherein
the value is updated based on the value selected for the first item of conventional metadata.

2. The method of claim 1, wherein the value of the first item of conventional metadata specifies a most recent access time for the file system object.

3. The method of claim 1, wherein the value of the first item of conventional metadata specifies a most recent access time for the file system object, and wherein the file system is a shared file system in a clustered computing system.

4. The method of claim 3, further comprising generating the first item of advisory metadata, wherein the generating is performed by a first node in the clustered computing system, and wherein the generating is performed while the first node holds a shared lock on the file system object.

5. A method comprising:
receiving a request for a time value for a first item of conventional metadata;
accessing a first item of advisory metadata, wherein the first item of advisory metadata is associated with a namespace-visible parent directory and a first namespace-hidden subdirectory, wherein
the namespace-visible parent directory comprises a plurality of namespace-hidden subdirectories,
the plurality of namespace-hidden subdirectories comprises the first namespace-hidden subdirectory and a second namespace-hidden subdirectory,
the first item of conventional metadata is also associated with the namespace-visible parent directory, and
the first item of advisory metadata identifies a first transaction and a first time;
accessing a second item of advisory metadata, wherein
the second item of advisory metadata is also associated with the namespace-visible parent directory,
the second item of advisory metadata is also associated with the second namespace-hidden subdirectory, and
the second item of advisory metadata identifies a second transaction and a second time;
selecting the time value for the first item of conventional metadata, based upon the first item of advisory metadata and the second item of advisory metadata, wherein the accessing the first item of advisory metadata, the accessing the second item of advisory metadata, and the selecting the time value for the first item of conventional metadata are performed by a computing device implementing a file system; and
updating the time value of the first item of conventional metadata, wherein
the time value is updated based on the time value selected for the first item of conventional metadata.

6. The method of claim 5, wherein the selecting the time value comprises selecting a greater of the first time or the second time as the time value.

7. The method of claim 5, wherein the accessing the first item of advisory metadata comprises accessing a log, wherein the log stores a plurality of items of advisory metadata, including the second item of advisory metadata.

8. The method of claim 5, further comprising generating the first item of advisory metadata in response to detecting a modification to contents of one of the plurality of namespace-hidden partitioned directories, wherein the modification is caused by the first transaction.

9. The method of claim 8, wherein the generating the first item of advisory metadata is performed after gaining shared access to the namespace-visible parent directory.

10. The method of claim 5, wherein the accessing the first item of advisory metadata, the accessing the second item of advisory metadata, and the selecting the time value are performed in response to receiving a request to replay a transaction during crash recovery.

11. The method of claim 5, further comprising generating the first item of advisory metadata and the second item of advisory metadata during overlapping time periods.

12. The method of claim 11, wherein
the first item of advisory metadata was recorded in a memory before the second item of advisory metadata was recorded in the memory, and
the second time is earlier than the first time.

13. A non-transitory computer readable storage medium comprising program instructions executable to:
receive a request for a time value for a first item of conventional metadata;
access a first item of advisory metadata, wherein the first item of advisory metadata is associated with a namespace-visible parent directory and a first namespace-hidden subdirectory, wherein
the namespace-visible parent directory comprises a plurality of namespace-hidden subdirectories,
the plurality of namespace-hidden subdirectories comprises the first namespace-hidden subdirectory and a second namespace-hidden subdirectory,
the first item of conventional metadata is also associated with the namespace-visible parent directory, and
the first item of advisory metadata identifies a first transaction and a first time;
access a second item of advisory metadata, wherein
the second item of advisory metadata is also associated with the namespace-visible parent directory,
the second item of advisory metadata is also associated with the second namespace-hidden subdirectory, and
the second item of advisory metadata identifies a second transaction and a second time;
select the time value for the first item of conventional metadata, based upon the first item of advisory metadata and the second item of advisory metadata, wherein the time value for the first item of conventional metadata is selected by a computing device implementing a file system; and update the time value of the first item of conventional metadata, wherein the time value is updated based on the time value selected for the first item of conventional metadata.

14. The non-transitory computer readable storage medium of claim 13, wherein selection of the time value comprises selection of a greater of the first time or the second time as the time value.

15. The non-transitory computer readable storage medium of claim 13, wherein the program instructions are further executable to generate the first item of advisory metadata in response to detecting a modification to contents of one of the plurality of namespace-hidden partitioned directories, wherein the modification is caused by the first transaction.

16. The non-transitory computer readable storage medium of claim 15, wherein generation of the first item of advisory metadata is performed after gaining shared access to the namespace-visible parent directory.

17. A system comprising:
one or more processors; and
a memory coupled to the one or more processors, wherein the memory stores program instructions executable to:
receive a request for a time value for a first item of conventional metadata;
access a first item of advisory metadata, wherein
the first item of advisory metadata is associated with a namespace-visible parent directory and a first namespace-hidden subdirectory,
the namespace-visible parent directory comprises a plurality of namespace-hidden subdirectories,
the plurality of namespace-hidden subdirectories comprises the first namespace-hidden subdirectory and a second namespace-hidden subdirectory,
the first item of conventional metadata is also associated with the namespace-visible parent directory, and
the first item of advisory metadata identifies a first transaction and a first time;
access a second item of advisory metadata, wherein
the second item of advisory metadata is also associated with the namespace-visible parent directory,
the second item of advisory metadata is also associated with the second namespace-hidden subdirectory, and
the second item of advisory metadata identifies a second transaction and a second time;
select the time value for the first item of conventional metadata, based upon the first item of advisory metadata and the second item of advisory metadata, wherein
the time value for the first item of conventional metadata is selected by a computing device implementing a file system; and
update the time value of the first item of conventional metadata, wherein
the time value is updated based on the time value selected for the first item of conventional metadata.

18. The system of claim 17, wherein selection of the time value comprises selection of a greater of the first time or the second time as the time value.

19. The system of claim 18, wherein the program instructions are further executable to generate the first item of advisory metadata in response to detecting a modification to contents of one of the plurality of namespace-hidden partitioned directories, wherein the modification is caused by the first transaction.

20. The system of claim 19, wherein generation of the first item of advisory metadata is performed after gaining shared access to the namespace-visible parent directory.

* * * * *